Patented Sept. 9, 1952

2,610,198

UNITED STATES PATENT OFFICE 2,610,198

ORGANOSILYL AMIDES

Leo Harry Sommer, State College, Pa., assignor to Dow Corning Corporation, Midland, Mich., a corporation of Michigan No Drawing. Application April 13, 1950, Serial No. 155,781

5 Claims. (Cl. 260—448.2)

The present invention relates to omega-silyl substituted amides and to their preparation.

Compounds in accordance herewith are of the general formula $R(CH_3)_2Si(CH_2)_nCONH_2$ in which R represents methyl or phenyl and $n$ has an average value of from 2 to 5, inclusive. In accordance herewith compounds of this general formula are produced by reacting liquid ammonia with acyl halides of the general formula $R(CH_3)_2Si(CH_2)_nCOX$ where R and $n$ have the meanings indicated and X represents halogen, preferably chlorine or bromine.

In the following description of methods for the preparation of raw materials, the terms "triorganosilyl" and "triorganosilane" are employed to refer collectively to trimethylsilyl, phenyldimethylsilyl, and trimethylsilane and phenyldimethylsilane, respectively.

In the preparation of the acyl halides employed in the method hereof, the omega-triorganosilyl-substituted propionic to hexoic acids are necessary intermediates. These acids may be prepared as follows:

For the preparation of the silyl-substituted propionic acid, chloromethyltrimethylsilane and chloromethyldimethylphenylsilane may be employed as raw materials. These two raw materials are described in the literature. These chloromethylsilanes may be subjected to the malonic ester synthesis, which is a general synthetic method known in organic chemistry. As applied to the present synthesis, the chloromethylsilane is reacted with an equivalent weight of the sodium salt of diethyl malonate. The reaction product is saponified, hydrolyzed, and decarboxylated, as is known in this type of synthesis. The product is the omega-triorganosilyl propionic acid.

To prepare the triorganosilyl butyric acid, the chloromethylsilanes may be reacted with an equivalent weight of magnesium in diethyl ether to prepare the Grignard reagent. This may be reacted with ethylene oxide. By this method there is obtained the omega-triorganosilylpropanol. This substituted propanol may be converted by reacting it with an equivalent weight of phosphorous tribromide to the omega-triorganosilylpropyl bromide. This substituted propyl bromide may be reacted with an equivalent weight of magnesium in diethyl ether to prepare the equivalent Grignard reagent. This Grignard reagent is then reacted with carbon dioxide, as by pouring it on solid carbon dioxide, to form a complex which upon hydrolysis with water yields the triorganosilylbutyric acid.

The triorganosilylvaleric acid may be prepared from the triorganosilylpropyl bromide prepared as above described. When the malonic ester synthesis above described is employed with this substituted propyl bromide, the triorganosilylvaleric acid is obtained.

The omega-triorganosilylhexoic acid may be prepared from the above-described triorganosilylpropyl bromide by preparing a Grignard reagent of this bromide and reacting this Grignard reagent with ethylene oxide. By this method the omega-substituted triorganosilylamyl alcohol is produced. This may be converted to the bromide by reacting it with an equivalent weight of thionyl bromide. A Grignard reagent is prepared from this substituted amyl bromide, which Grignard reagent is then reacted with carbon dioxide by the method above stated to yield a complex, which upon hydrolysis with water produces the omega-triorganosilylhexoic acid.

The above-described acids may be converted to the equivalent acyl halides by reacting them with an equivalent weight of any conventional halogenating agent, such as thionyl chloride, benzoyl chloride, phosphorous trichloride, or the corresponding bromides.

In accordance with the method hereof the acyl halides described are reacted with liquid ammonia. Very vigorous reaction is obtained upon mixture of the ammonia and the acyl halide. Purely to suppress the reaction and avoid an unduly high rate of reaction which would cause loss of ammonia, it is desirable to conduct the reaction at low temperatures, such as below 0° C. The reaction forms the ammonium halide as a by-product. The amide produced in accordance herewith preferably is separated from the ammonium halide. This may be effected by dissolving the amide in any conventional solvent in which amides are soluble and in which ammonium halides are insoluble, for example, diethyl ether. The amide may then be recovered from the solution.

By mixing the various amide compounds hereof, compositions may be obtained in which $n$ has fractional values instead of whole values.

The products hereof find their principal utility as chemical intermediates for the production of other products of direct utility. Thus, the amides hereof may be converted by standard procedures to the corresponding amines. These amines are of extensive utility in the form of their quaternary salts as thermally decomposable emulsifying agents for siloxane fluids, such as dimethylpolysiloxane.

*Example 1*

Beta-trimethylsilylpropionamide was prepared as follows:

The sodium salt of diethyl malonate was prepared from sodium ethylate, using 200 grams of sodium and from 790 grams of diethyl malonate. The alcoholic solution of the sodium salt was clear and yellow. This sodium salt was reacted with 514.5 grams of chloromethyltrimethylsilane, which was added gradually with the reaction mixture being heated under reflux. This reaction product was saponified by the addition of 561 grams of potassium hydroxide dissolved in 570 cc. of water, the saponification being effected at room temperature, following which the reaction mixture was refluxed for two and one-half hours. Ethanol was removed by distillation. The potassium salt so formed was hydrolyzed by the addition of one liter of concentrated hydrochloric acid. Reaction mixture was stirred under reflux for five hours, whereby trimethylsilylpropionic acid was formed as an upper layer. This acid boils at 90.5° C. at a pressure of 37 mm. mercury and has a refractive index of $n_D^{20}$ equal to 1.4192.

The beta-trimethylsilylpropionic acid so prepared, in the amount of 73 grams, was added gradually at room temperature to 89.3 grams of thionyl chloride. After one-half hour, when the addition was complete, the reaction mixture was heated to 83° C. and maintained at that temperature for three hours. Excess thionyl chloride was removed by flash distillation at 25° C. at a pressure of 4 mm. mercury. The reaction product, which was substantially entirely beta-trimethylsilylpropionyl chloride, was added to a solution of 50 grams of liquid ammonia in 50 cc. of diethyl ether at −70° C. Vigorous reaction occurred, with the formation of ammonium chloride. An additional 150 cc. of ether was added to maintain the slurry in a fluid state. The temperature was raised to room temperature. The solution was removed from the salt by filtration, and the salt was washed with additional ether. The product was crystallized by concentrating the ethereal solution and then cooling. The trimethylsilylpropionamide product was obtained as transparent plate crystals which had a melting point of 92–93° C.

*Example 2*

Gamma-trimethylsilylbutyramide was prepared as follows:

Chloromethyltrimethylsilane, in amount of 6.8 grams, was mixed with 32.6 grams of magnesium and 25 ml. of diethyl ether. One crystal of iodine was added. When the reaction had started, 184 grams of chloromethyltrimethylsilane dissolved in 550 ml. of diethyl ether was added. The solution was stirred for two hours at 100° C. The solution was cooled to approximately −10° C., whereupon 100 ml. of ethylene oxide dissolved in 125 ml. of diethyl ether were added. The temperature of the mixture was allowed to rise gradually. The ether was distilled from the reaction mixture and replaced with 750 ml. of benzene. The solution was poured onto one liter of cracked ice, and 250 ml. of concentrated hydrochloric acid were added. The benzene layer was fractionated, whereby gamma-trimethylsilylpropanol was obtained, which has a boiling point of 62° C. at a pressure of 6.2 mm. mercury. Two moles of this product were mixed with one mole of phosphorous tribromide at 0° C. and allowed to stand for 1.5 hours. The reaction mixture was heated to 85° C. and held at that temperature for nine hours. Excess phosphorous tribromide was decomposed with water. The residue was fractionated, whereby gamma-trimethylsilylpropyl bromide was obtained, which had a boiling point of 67.5° C. at a pressure of 21 mm. mercury. 57.5 grams of this bromide were reacted with 38 grams of magnesium in 100 ml. of diethyl ether and in the presence of one crystal of iodine. When the reaction had started, an additional 500 ml. of the ether and 235 grams of the bromide were added. The mixture was heated under reflux for fifteen hours. The product was poured onto 1500 grams of solid carbon dioxide. A solution of 140 ml. of concentrated hydrochloric acid in one liter of water was added to hydrolyze the product. The product was distilled, whereby $(CH_3)_3Si(CH_2)_3COOH$ was obtained, which had a boiling point of 117.8° C. at a pressure of 100 mm. mercury.

The substituted butyric acid so prepared, in amount of 128 grams, was added gradually at 0° C. to 95 ml. of thionyl chloride. During twenty hours the temperature was gradually raised to 90° C. The reaction product was fractionally distilled, whereby gamma - trimethylsilylbutyryl chloride was obtained, which had a boiling point of 105° C. at a pressure of 57 mm. mercury and a refractive index of $n_D^{20}$ equal to 1.4331. The density at 20° C. was 0.9464.

The gamma-trimethylsilylbutyryl chloride so produced, in amount of 80.3 grams dissolved in 65 ml. of diethyl ether, was added at −70° C. to a solution of 85 grams of liquid ammonia dissolved in 135 ml. of diethyl ether. Excess ammonia was expelled by heating following the reaction. The solid ammonium chloride was removed by filtration. The ether solution was concentrated, whereby gamma-trimethylsilylbutyramide was obtained in the form of flake crystals. This crude product was recrystallized from heptane, whereby a purified product was obtained which had a melting point of 66.5 to 66.7° C.

*Example 3*

Beta - phenyldimethylsilylpropionamide was prepared as follows:

Beta-phenyldimethylsilylpropionic acid was prepared by the method described in Example 1, with the substitution of chloromethyldimethylphenylsilane for the chloromethyltrimethylsilane there employed. 24 grams of the beta-phenyldimethylsilylpropionic acid were heated in mixture with 59 grams of thionyl chloride at 90° C. for two hours. The reaction product was fractionally distilled, whereby beta-phenyldimethylsilylpropionyl chloride was obtained, which had a boiling point of 114° C. at a pressure of 3 mm. mercury, a refractive index of $n_D^{20}$ equal to 1.5188, and a density at 20° C. of 1.0664.

One mole of the beta-phenyldimethylsilylpropionyl chloride so prepared was added to a solution of 5 moles of liquid ammonia in an equal volume of diethyl ether at −70° C. The excess ammonia was removed by warming the reaction mixture, the salt separated by filtration, and the product recovered by concentration of the ethereal solution and crystallization. A solid crystalline product may be obtained.

That which is claimed is:

1. Compositions of the general formula $$R(CH_3)_2Si(CH_2)_nCONH_2$$

in which R represents a radical of the group consisting of methyl and phenyl and $n$ has an average value of from 2 to 5.

2. Compositions of the general formula $$(CH_3)_3Si(CH_2)_nCONH_2$$

in which $n$ has an average value of from 2 to 5.

3. $(CH_3)_3Si(CH_2)_2CONH_2$.
4. $(CH_3)_3Si(CH_2)_3CONH_2$.
5. $C_6H_5(CH_3)_2Si(CH_2)_2CONH_2$.

LEO HARRY SOMMER.

REFERENCES CITED

The following references are of record in the file of this patent:

Sommer et al.: Jour. Am. Chem. Soc., vol. 71 (1949), p. 1509.

Sommer et al.: Jour. Am. Chem. Soc., vol. 72 (1950), pp. 1935–39.

Feiser et al.: Organic Chemistry (1944), p. 186, Heath and Co., publishers.